US012807459B2

(12) United States Patent
Bygrave et al.

(10) Patent No.: US 12,807,459 B2
(45) Date of Patent: Nov. 24, 2026

(54) RAIL JOINTS

(71) Applicant: GANTRY RAILING LTD., Gloucester (GB)

(72) Inventors: Peter Nathan Bygrave, Gloucester (GB); Jordan Hey, Gloucester (GB); Reece Halling, Gloucester (GB)

(73) Assignee: GANTRY RAILING LTD., Gloucester (GB)

( * ) Notice: Subject to any disclaimer, the term of this patent is extended or adjusted under 35 U.S.C. 154(b) by 287 days.

(21) Appl. No.: 18/835,114

(22) PCT Filed: Jan. 5, 2023

(86) PCT No.: PCT/GB2023/050011
§ 371 (c)(1),
(2) Date: Aug. 1, 2024

(87) PCT Pub. No.: WO2023/148469
PCT Pub. Date: Aug. 10, 2023

(65) Prior Publication Data

US 2025/0136416 A1 May 1, 2025

(30) Foreign Application Priority Data

Feb. 4, 2022 (GB) ..................................... 2201490

(51) Int. Cl.
*B66C 7/14* (2006.01)
*E01B 11/42* (2006.01)

(52) U.S. Cl.
CPC ................ *B66C 7/14* (2013.01); *E01B 11/42* (2013.01)

(58) Field of Classification Search
CPC .... B66C 7/14; B66C 5/10; B66C 7/08; B66C 7/10; E01B 11/42
See application file for complete search history.

(56) References Cited

U.S. PATENT DOCUMENTS 128,592 A * 7/1872 Close ...................... E01B 11/42
8,840,035 B1 * 9/2014 Remington et al. .... E01B 11/42

FOREIGN PATENT DOCUMENTS

CN 118753982 A * 10/2024 ............... B66C 7/10
EP 2951117 B1 9/2017

(Continued)

OTHER PUBLICATIONS

Foreign Patent with translation (Year: 2024).*

(Continued)

*Primary Examiner* — S. Joseph Morano
(74) *Attorney, Agent, or Firm* — Studebaker Brackett PLLC

(57) ABSTRACT

A rail 13 for supporting a trolley 14 of gantry crane 10 has rail sections 18,19 on opposites sides of a joint 17 provided with end regions 20 of a modified rail head profile that directs the wheels of the trolley 14 over ridges 23 that rise gradually above the height L1 of the rail head 27 while approaching the joint 17. The ridges 23 then carry the wheels into the joint 17 where the transition from one rail section to the next occurs over reinforced region. The load-bearing apexes A of the ridges are disposed away from the side edges of the rail 13 and away from the ends of each projecting portion 21. The rail increases the operational life of a crane rail by reducing wear rate in high stress areas of the joint 17 and by adding additional wear material above the rail at the joint.

21 Claims, 7 Drawing Sheets

(56) References Cited

FOREIGN PATENT DOCUMENTS

| | | | | |
|---|---|---|---|---|
| JP | 2010189132 A | 9/2010 | | |
| JP | 2010235308 A | 10/2010 | | |
| KR | 100732700 B1 | 6/2007 | | |
| WO | WO 2014118437 A1 * | 8/2014 | ............... | B66C 7/14 |

OTHER PUBLICATIONS

Foreign Patent with translation (Year: 2014).*
Search Report issued by the Intellectual Property Office of the United Kingdom in U.K. Patent Application No. GB2201490.6; Date of search Jun. 29, 2022.
International Search Report issued in PCT/GB2023/050011; mailed Apr. 13, 2023.
Written Opinion of the International Searching Authority issued in PCT/GB2023/050011; mailed Apr. 13, 2023.

* cited by examiner

RAIL JOINTS

This invention relates to joints between rails for carrying wheeled vehicles and more particularly but not solely to joints between rails disposed on a gantry crane.

Gantry cranes are widely used in dockyards and other locations for loading and unloading containerised goods for example. Typically, gantry cranes comprise a large chassis having wheels for running on the ground along a first axis and an elevated boom extending along a perpendicular second axis. Containers being handled by the crane are supported by cables which depend from a trolley that is mounted for movement along the longitudinal axis of the boom. Typically, the trolley has wheels which run on a pair of parallel rails fixed to a support surface on the boom.

Gantry cranes for handling containers in dockyards may comprise hinged booms, which extend from the chassis of the crane across the width of a docked ship. The hinged boom can be raised in order to allow ships to enter and leave the dockside unhindered and it will be appreciated that a joint must thus be provided in the rails to achieve this. Typically, such joints are provided between longitudinally disposed rail sections of the hinged and unhinged parts of the boom as lap joints, so that their adjacent ends overlap and provide a smooth transition from one rail section to the next with no gap.

The elongate rails used on gantry cranes comprise a base portion for seating on a support surface, an upstanding central web which extends between the base portion and a head portion of the rail on which the trolley runs. The upper surface of the head portion of the rail curves upwardly from its opposite longitudinal side edges towards its centre, such that the wheels of the trolley are supported by a central region which extends longitudinally of the rail head directly at a position disposed above the upstanding web portion of the rail.

A problem with this arrangement is that the ends of the adjacent rail sections are cut longitudinally along this central region and down the web to form the respective projecting and rebated portions of the lap joint, with the result that the load of the trolley traversing the joint 100 to 200 times per day is borne along the opposed cut longitudinal upstanding side surfaces of the rail sections and this causes wear and damage to one or both rail sections due to impact from the wheels, which create stress fractures that propagate down the side surfaces of the web and lead to failure. The damage caused to the joint means that the rails have to be replaced every 5 to 7 years and sometimes sooner. Typically, the rails are replaced along the whole length of the boom, which is both costly and puts the crane out of action for a considerable time.

With the foregoing in mind, we have now devised improvements relating to rail joints.

In accordance with the present invention, as from a first aspect, there is provided a rail having a rail head defining an upper rail surface for supporting a wheeled vehicle and a base defining a lower rail surface for engaging a support structure, the rail being divided by a joint into first and second rail sections, adjacent end regions of the rail sections each comprising a projecting portion and a rebated portion respectively disposed on first and second opposite longitudinal sides thereof, the projecting portions of each rail section longitudinally overlapping each other in use, such that the projecting portion of the first rail section extends into the rebated portion of the second rail section and vice versa, wherein the upper rail surface at each adjacent end region is truncated by the rebated portion along one side edge thereof and has a profile which is modified compared with its profile remote from said end region, the modified profile of the upper rail surface at each adjacent end region comprising an elongate ridge section which extends longitudinally of its projecting portion and has an apex which is disposed at a position away from the truncated side edge of the upper rail surface.

The joint may be formed between rail sections which respectively extend along the inner and outer ends of the boom of a gantry crane. The joint allows one rail section to pivot upwardly relative to the other rail section between a longitudinally aligned in use position and a deflected position, Alternatively, the joint may be an expansion joint formed between rail sections which are permanently longitudinally aligned.

The present invention solves the foregoing problem because the load of the trolley or other vehicle traversing the joint is borne along the elongate ridge sections of the projecting outer end portions at a point which is disposed away from its side edge where the upper rail surface is truncated by the rebate. Accordingly, much less force is applied down the rebated side of the rail and hence there is less risk of wear and damage to one or both rail sections from impact by the wheels.

The apex of each elongate ridge section may be disposed at a position away from both opposite longitudinal side edges of the projecting portion on which it is provided. Each elongate ridge section may extend centrally of the projecting portion on which it is provided.

Adjacent end regions of the rail sections may each further comprise an inner end portion from which the projecting portion extends, the elongate ridge section of each end region extending from its projecting portion into said inner end portion. In this manner, the load of the trolley or other vehicle traversing the joint is borne by the elongate ridge sections for a distance before and after it traverses the joint.

Each inner end portion may further comprise a short ridge section which extends parallel to the elongate ridge section towards the rebate, in use, the short ridge section of each member extending end-to-end with the elongate ridge section of the other member.

It will be appreciated that the supporting web portion at each projecting outer end portion of known joints is reduced by at least 50% in thickness where it is cut to form the rebated portion of the lap joint. The projecting outer ends of the rail sections are thus weaker, and this further exacerbates the risk of failure of the joint. In order to overcome this problem, the opposite sides of the rail at the joint comprise reinforcing material which extends between the head and base portions of the rail. This lateral material increases the cross-sectional area of the rail between the base and head portions and strengthens the projecting outer ends of the rail.

The reinforcing material may substantially close a recess which extends longitudinally along each side of the rail remote from said joint.

The reinforcing material may comprise strengthening members which are bolted or otherwise secured along the opposite sides of the rail at the joint.

It is inevitable that the upper surface of the rail will wear as the trolley or other vehicle traverses the joint. In order to extend the longevity of the joint and to add strength, the apex of each ridge section may extend for a substantial part at a level which is above that of the upper rail surface remote from said end region. The increased height of the ridge sections allows for more wear and also strengthens the joint.

Opposite ends of the ridges provided by the ridge sections may taper downwardly towards the upper rail surface remote from said end region, so as to avoid an abrupt change in the level of the rail.

In one embodiment, the end region of each rail section is formed integrally with an elongate rail member, for example by machining or casting the end of the rail member to the required shape.

In another embodiment, each rail section comprises an elongate rail member disposed end-to-end with a shorter rail end member, the end region of each rail section being formed integrally with the rail end member, for example by machining or casting the end of the rail end member to the required shape.

It will be appreciated that it is much easier to form the end of a shorter rail member to the required shape and that it is possible to repair existing rails relatively easily by cutting away a length of the rail adjacent the joint and fitting the shorter rail end members in place.

In another embodiment, each elongate ridge section is provided on a respective capping member which is secured, for example by bolting or welding it onto a complementary formation provided on the end region of the respective rail section.

In one embodiment, the complementary formation of each rail section is formed integrally with an elongate rail member, for example by machining or casting the end of the rail member to the required shape.

In another embodiment, each rail section comprises an elongate rail member disposed end-to-end with a shorter rail end member, the complementary formation of each rail section being formed integrally with the rail end member, for example by machining or casting the end of the rail end member to the required shape.

Each capping member may further comprise a short ridge section which extends parallel to the elongate ridge section, the short ridge section of each member extending end-to-end with the elongate ridge section of the other member when the rail sections are in the longitudinally aligned in use position.

A notch may extend from one end of the capping member between the parallel ridge sections of each capping member, the rail section comprising a finger which extends into the notch and helps to position the capping member. In this embodiment, the tapering opposite ends of the ridges provided by the ridge sections may taper downwardly towards to a point below the upper surface of the fingers.

Also in accordance with the present invention, as seen from a second aspect, there is provided a said rail section for forming a rail as hereinbefore defined.

Also in accordance with the present invention, as seen from a third aspect, there is provided a gantry crane comprising a pair of rails as hereinbefore defined, the rail sections of each rail being respectively provided on opposite sides of a hinge between a boom and an a chassis of the crane.

Also in accordance with the present invention, a seen from a fourth aspect, there is provided a method of forming a rail as hereinbefore defined, the method comprising mounting said rail sections on respective opposite sides of a joint between two support structures.

In one embodiment, each rail section is formed by laying a said short rail end member end-to-end with an elongate rail member. A section of the elongate rail member may be cut away and the short rail end member laid in its place.

In an alternative embodiment, the capping member is secured onto the complementary formation provided the end region of the respective rail section, for example by bolting or welding it in-situ.

The complementary formation may be formed by machining or casting the end region of the rail section.

Embodiments of the present invention will now be described by way of examples only and with reference to the accompanying drawings, in which.

Figure 1:
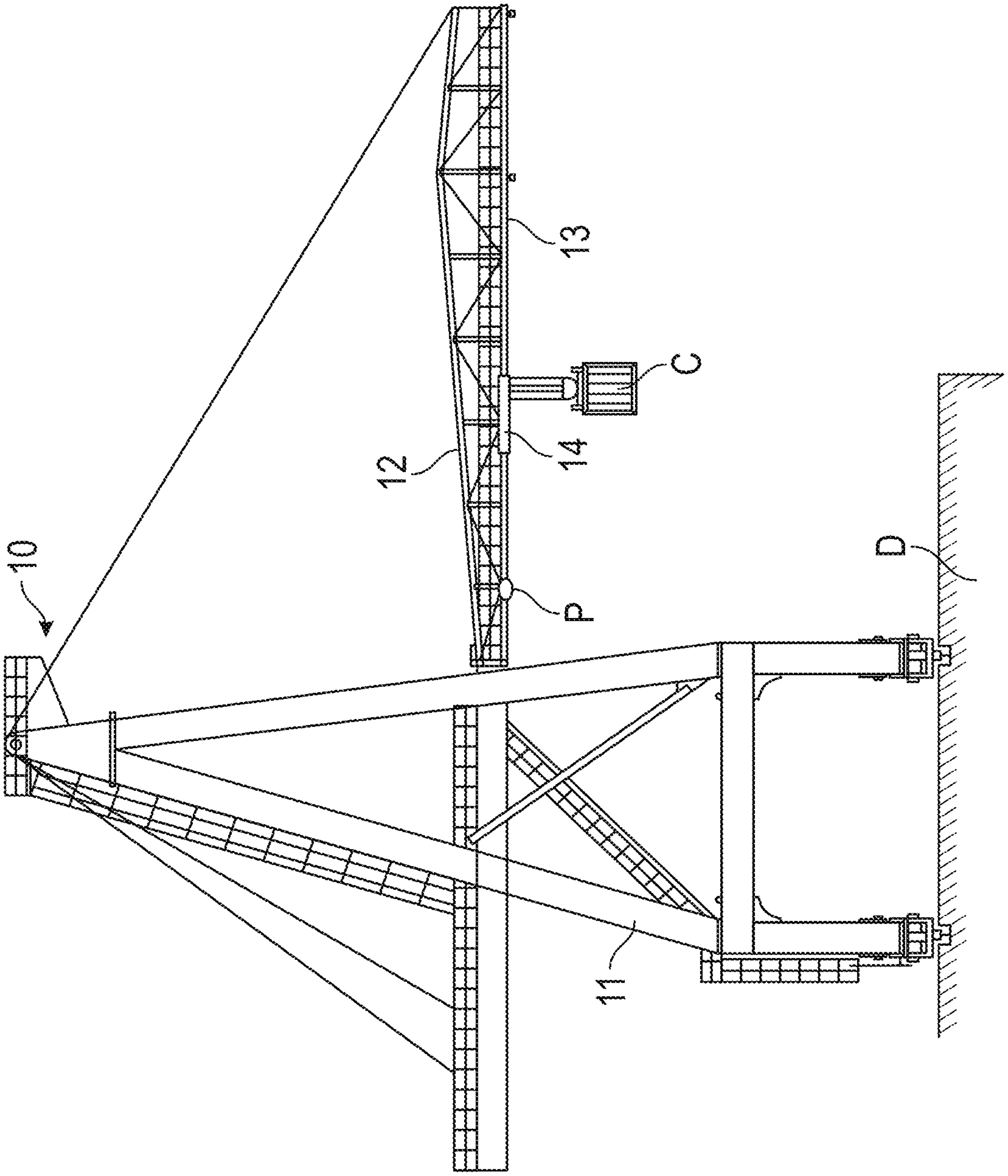
FIG. 1 is a side view of a gantry crane incorporating an embodiment of rail in accordance with the present invention.
Figure 2B:
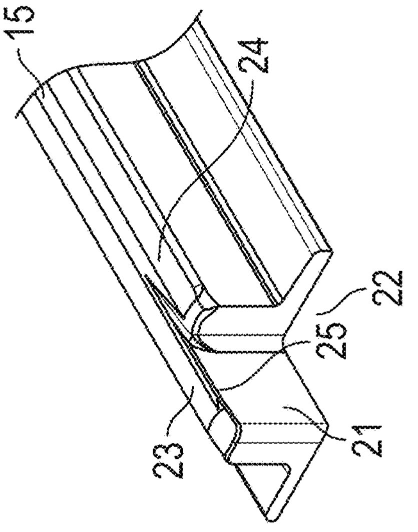
FIG. 2B is an enlarged view of an end region of the rail section of FIG. 2A.
Figure 2A:
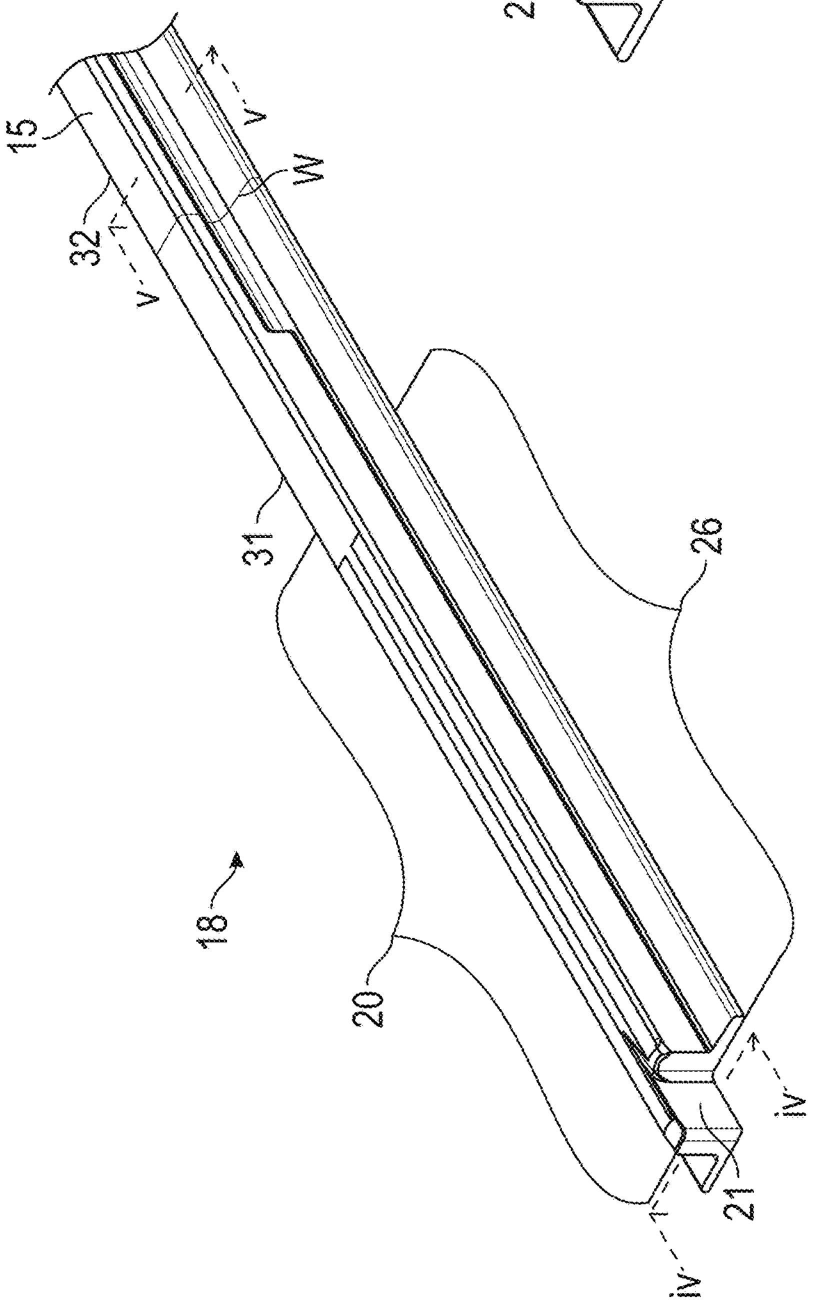
FIG. 2A is a perspective view from one side and above of a section of the rail of the gantry crane of FIG. 1.
Figure 3:
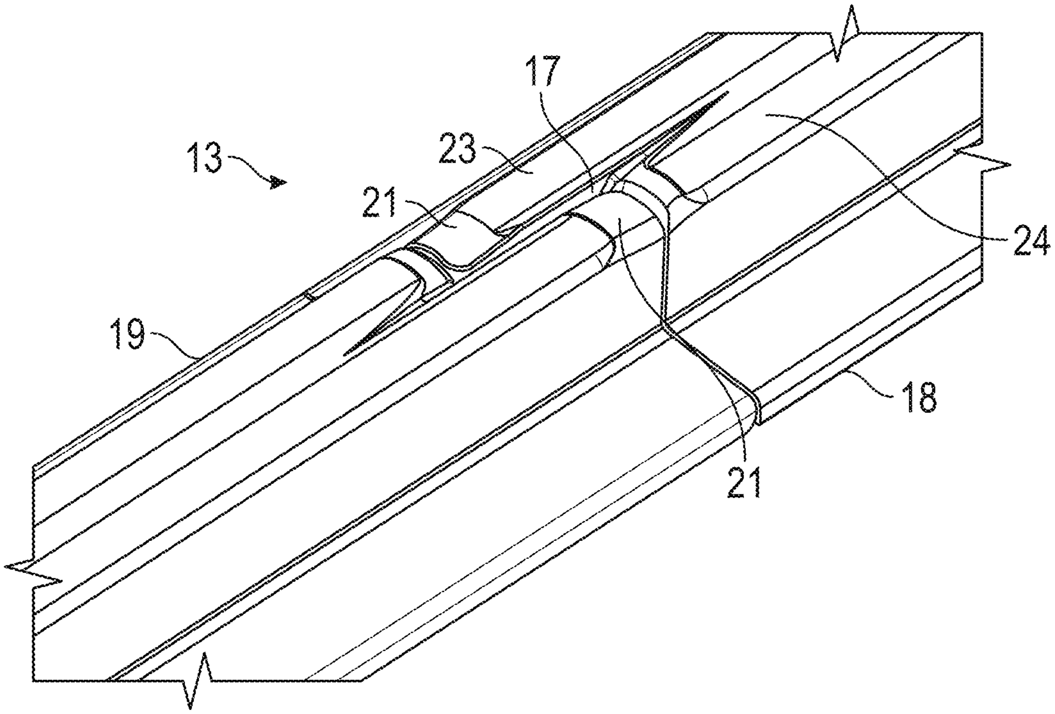
FIG. 3 is a perspective view from one side and above of a joint between sections of the rail of the gantry crane of FIG. 1.

Referring to FIG. 1 of the drawings, there is shown a typical gantry crane 10 comprising a large chassis 11 having wheels for running on rails fixed to the ground (e.g. dockside D) along a first axis. The gantry crane 10 comprises an elevated boom 12 which extends perpendicular to the first axis along a second axis. Containers e.g. C being handled by the gantry crane 10 are supported by cables which depend from a trolley 14 that is mounted for movement along the longitudinal axis of the boom 12.

The trolley 14 has wheels which run on the upper surface of each of a pair of steel rails e.g. 13. The rails 13 have their lower surfaces fixed to a support surface of the boom 12, for example using clips of the kind disclosed in our co-pending patent application GB2591259. The boom 12 of the gantry crane 10 is pivoted at point P, so that the outer end of the boom 12 can be raised in order to allow ships to enter and leave the dockside D unhindered. As will be described hereinafter, a joint is provided in the rail 13 at point P, in order to allow the boom 12 of the gantry crane 10 to be raised and lowered as required.

Referring to FIGS. 2 to 5 of the drawings, each rail 13 is divided by joint 17 into first and second rail sections 18, 19 which respectively extend along the inner and outer ends of the boom 12. The joint 17 allows the second rail section 19 to pivot upwardly relative to the first rail section 18 between a longitudinally aligned in use position and a raised position.

Each rail section 18,19 comprises a short rail end member 31 which extends from the joint 17 and is mounted end-to-end with an elongate rail member 32. Each rail end member 31 has an end region 20 of a modified cross-sectional shape that is formed by machining or casting its end to the required shape. It will be appreciated that the rails 13 of traditional gantry cranes can be modified by cutting away end sections of the elongate rail on opposite sides of the joint and fitting the rail end members 31 in place. The elongate rail member 32 is thus of a traditional shape and comprises a base portion 26 on which its lower rail surface 16 is provided, a head portion 27 on which its upper rail surface 15 is provided and a web-shaped support portion 28 extending between the base and head portions 29, 27. The opposite longitudinal sides of elongate rail member 32 comprise longitudinally-extending recesses 30.

Adjacent end regions 20 of the short rail end members 31 each comprise a projecting portion 21 and a rebated portion 22 which are respectively disposed on first and second opposite longitudinal sides thereof. The projecting portions 22 of each member 31 longitudinally overlap each other at the joint 17 when the boom 12 is in its lowered (in use) position, such that the projecting portion 21 of rail section 18 extends into the rebated portion 22 of the other rail section 19 and vice versa.

The upper rail surface 15 at each end region 20 of each rail end member 31 is truncated by the rebated portion 22 along one side edge 25 thereof and has a modified profile which is different from the profile of the upper rail surface 15 along the entire rail 13 remote from the end regions 20. The modified profile at each adjacent end region 20 of the rail sections 18, 19 comprises a first elongate ridge 23 which extends longitudinally of its projecting portion 21. The first elongate ridge 23 has an apex A which extends centrally of the projecting portion 21 on which it is provided and is disposed at a position away from opposite longitudinal side edges of the projecting portion 21.

Adjacent end regions 20 of the rail sections 18, 19 each further comprise an inner end portion 26 from which the projecting portion 21 extends. Each inner end portion 26 of the rail sections 18, 19 further comprises a second ridge 24 which extends parallel to the first ridge 23 towards the rebate 22. The second ridge 24 of each rail section e.g. 18 extends end-to-end with the first ridge 23 of the other rail section e.g. 19 when the boom 12 is in its lowered (in use) position.

The first ridge 23 of each end region 20 also extends from its projecting portion 21 into the inner end portion 26 alongside the second ridge 24, so that the load of the trolley 14 traversing the joint 17 is borne by the ridges 23, 24 for a distance before and after it traverses the joint. The apex A of each ridge 23, 24 substantially extends at a level L1 which is above the level L2 of the upper rail surface 15 remote from the end region 20. The increased height of the ridge sections 23, 24 allows for more wear and also strengthens the joint 17. Opposite ends of the ridges 23, 24 taper downwardly from level L1 towards the level L2 of the upper rail surface 15, so as to avoid an abrupt change in the level of the rail 13.

Figure 4:
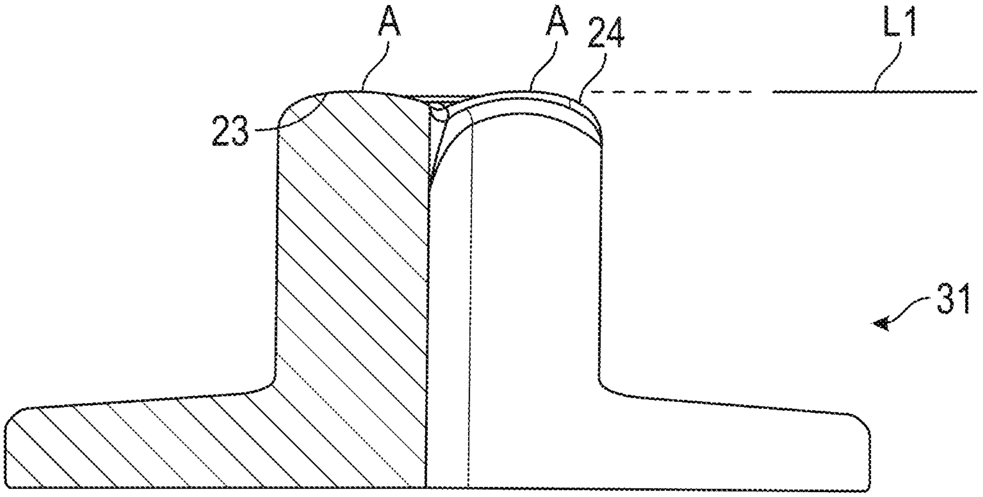
FIG. 4 is a sectional view along the line iv-iv of FIG. 2A.
Figure 5:
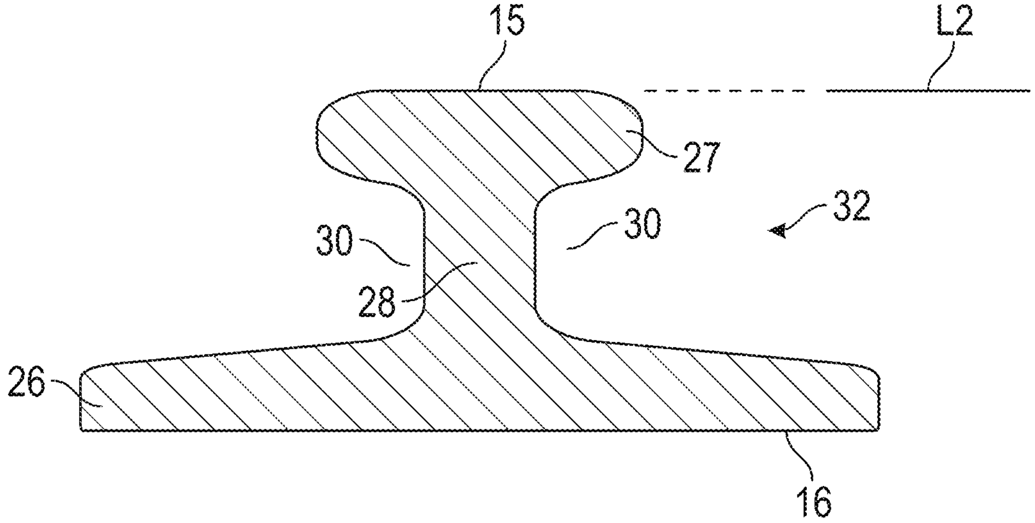
FIG. 5 is a sectional view along the line v-v of FIG. 2A.

The longitudinal side recesses 30 of the rail 30 terminate prior to each end region 20 of each rail end member 31 so that the ridges 23, 24 overly completely solid regions of steel that extend to the base 29 as shown in FIG. 4: this increases the cross-sectional area of the rail 13 and strengthens the projecting portions 21. The cross-sectional shape of proximal end of each rail end member 31 is the same as that of the elongate rail members 32, so that they can be welded together in the traditional way at point W.

In use, the load of the trolley 14 traversing the joint 17 is applied to the ridges 23, 24 along elongate regions which extend centrally of the projecting end portions 21 at a point disposed away from their inner side edges where the upper rail surfaces 15 are truncated by the rebates 22. Accordingly, much less force is applied down the rebated edge 25 of the rail 13 and the risk of wear and damage to one or both rail sections 18, 19 caused by impact from the trolley 14 is reduced.

Figure 6B:
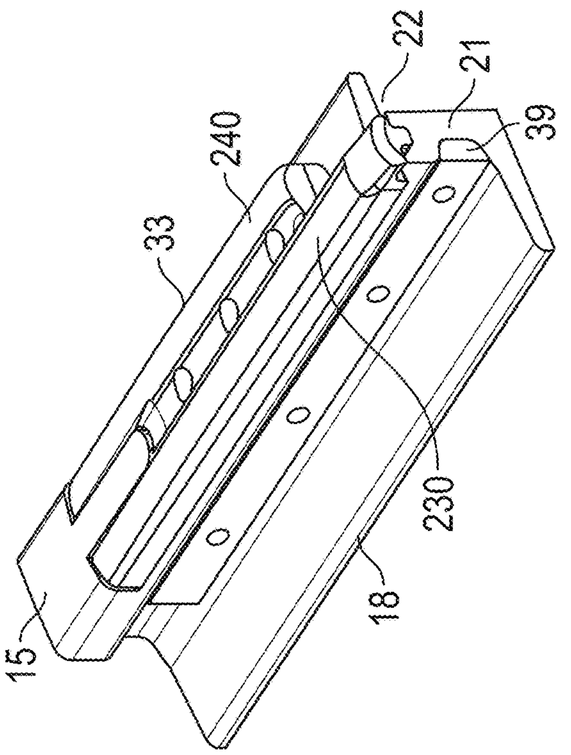
FIGS. 6A and 6B are exploded and assembled views of the outer end portion of rail section of an alternative embodiment of rail in accordance with the present invention.
Figure 6A:
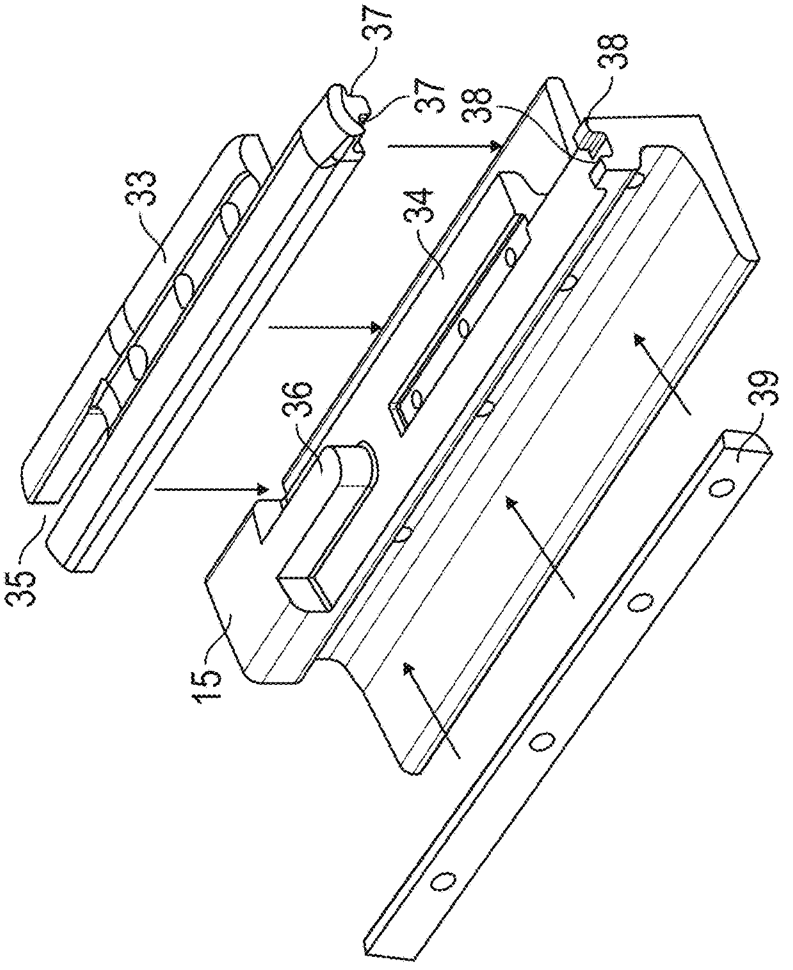

Referring to FIGS. 6A and 6B of the drawings, in another embodiment, rather than forming the end region 20 of each rail section 18, 19 integrally with the rail, the shape of each end region is modified by fitting a capping member 33 thereto. The capping members 33 are secured by bolting them onto respective complementary formations 34 which are formed at the end region 20 of the respective rail section, for example by machining or casting them to the required shape.

Each capping member 33 further comprise an elongate first ridge 230 which extends parallel to a second shorter ridge 240, the second ridge 240 of one capping member 33 extends end-to-end with the first ridge 230 of the other capping member 33 when the boom 12 is in its lowered (in use) position.

A notch 35 extends into the inner end of the capping member 33 between the parallel ridges 230,240, the rail sections 18, 19 each comprising a finger 36 which extends into the notch 25 in order to secure the position of the proximal end of the capping member 33. A pair of sockets 37 are formed on the underside of the outer end of the capping member 33, the rail sections 18, 19 each comprising a pair of upstanding tabs 38 which extends into respective sockets 37 in order to secure the position of the outer end of the capping member 33.

The use of capping members 33 allow existing joints to be repaired by simply machining the formation 34 into the existing rail. Since the longitudinal side recesses 30 of the rail 30 extend the full length of the rail, their end regions 20 can be strengthened by bolting or otherwise securing a strengthening member 39 along the opposite longitudinal sides of the overlapping end regions 20 of the rail 13. The strengthening member 39 ensures that the ridges 230, 240 overly completely regions of steel that extend to the base 29: this effectively increases the cross-sectional area of the rail 13 and strengthens the projecting portions 21. It will be appreciated that the capping members 33 can easily be replaced when they become worn or damaged.

Figure 7:
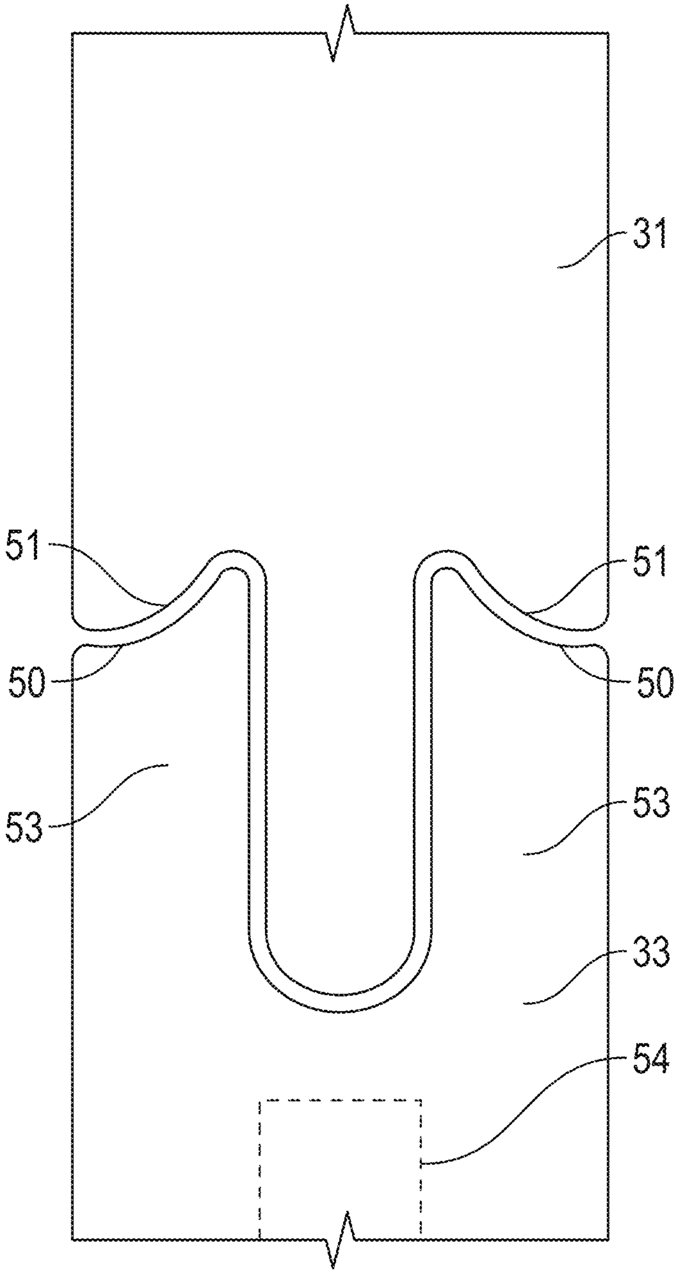
FIG. 7 is a plan view of a region of the outer end portion of rail section of an alternative embodiment of rail in accordance with the present invention.

Referring to FIG. 7 of the drawings, in another embodiment the bifurcated proximal end of each capping member 33 has end faces 50 which are keyed to the distal end faces 51 of the formation 34, so as to prevent the bifurcated end portions 53 separating. The underside of each capping member 33 may include a longitudinally-extending formation 54 which engages with a complementary formation (not shown) on the bottom face of the formation 34, so as to help maintain the position of the capping member 33.

Figure 8:
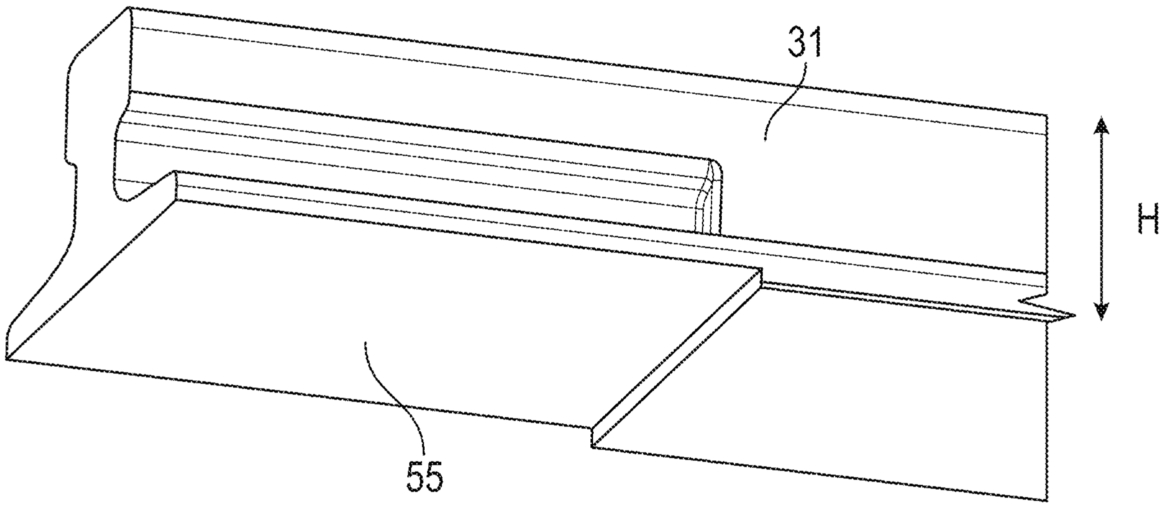
FIG. 8 is a perspective view from one side and below of the proximal end of a rail end member of an alternative embodiment of rail in accordance with the present invention.

Typically, the rail sections on opposite sides of the joint 17 are mounted on elongate rail pads (not shown) of elastomeric material. Hitherto, the rail pads have had to be cut to shape at the joint or cut short and both of these arrangements have disadvantages. In order to solve this problem and referring to FIG. 8 of the drawings, the height H of the short rail end member 31 of each rail section 18, 19 of the present invention is substantially equal to the height of the elongate rail member 32 with which it is joined combined with the height of the underlying rail pad. In this manner, the rail pad does not extend to the joint and the increased height of the short rail end member 31 compensates for the height lost by the rail pad. In order to avoid stresses on the weld W between the rail end member 31 and the elongate rail members 2, the underside of the proximal end of the rail end member 31 may be rebated at 55 so that the rail pad disposed under the elongate rail member 32 can extend under the weld W, thereby alleviating the risk of stress caused by the rail paid terminating directly under the weld W.

The present invention provides a rail with a unique rail head profile adjacent the joint that directs the trolley wheel over a surface that rises gradually above the height of the rail head while approaching the joint 17. It then carries the wheel into the joint 17 where the transition from one rail section e.g. 18 to the next e.g. 19 occurs over a transition region (supported by both projecting portions 21). The transition region is located above a stronger cross-section on each projecting portions, with the load-bearing surface of the ridges being disposed away from the side edges of the rail and away from the ends of each projecting portion 21.

A rail in accordance with the present invention simple and relatively inexpensive in construction yet increases the operational life of a crane boom rail by reducing wear rate in high stress areas of the joint and by adding additional wear material above the rail at the joint. The present invention reduces trolley vibration by directing the wheel over a smooth, undulating rail head profile.

The invention claimed is:

1. A rail having a rail head defining an upper rail surface for supporting a wheeled vehicle and a base defining a lower rail surface for engaging a support structure, the rail being divided by a joint into first and second rail sections, adjacent end regions of the rail sections each comprising a projecting portion and a rebated portion respectively disposed on first and second opposite longitudinal sides thereof, the projecting portions of each rail section longitudinally overlapping each other in use, such that the projecting portion of the first rail section extends into the rebated portion of the second rail section and vice versa, wherein the upper rail surface at each adjacent end region is truncated by the rebated portion along one side edge thereof and has a profile which is modified compared with its profile remote from said end region, the modified profile of the upper rail surface at each adjacent end region comprising an elongate ridge section which extends longitudinally of its projecting portion and has an apex which is disposed at a position away from the truncated side edge of the upper rail surface.

2. The rail as claimed in claim 1, in which the apex of each elongate ridge section is disposed at a position away from both opposite longitudinal side edges of the projecting portion on which it is provided.

3. The rail as claimed in claim 2, in which elongate ridge section extends centrally of the projecting portion on which it is provided.

4. The rail as claimed in claim 1, in which the adjacent end regions of the rail sections each further comprise an inner end portion from which the projecting portion extends, the elongate ridge section of each end region extending from its projecting portion into said inner end portion.

5. The rail as claimed in claim 4, in which each inner end portion further comprises a short ridge section which extends parallel to the elongate ridge section towards the rebate, the short ridge section of each member extending end-to-end with the elongate ridge section of the other member when the rail sections are in a use position.

6. The rail as claimed in claim 1, in which opposite sides of the rail at the joint comprise reinforcing material which extends between the head and base portions of the rail.

7. The rail as claimed in claim 6, in which the reinforcing material substantially closes a recess which extends longitudinally along each side of the rail remote from said joint.

8. The rail as claimed in claim 6, in which the reinforcing material comprises strengthening members which are bolted or otherwise secured along the opposite sides of the rail at the joint.

9. The rail as claimed in claim 1, in which the apex of each ridge extends for a substantial part at a level which is above that of the upper rail surface remote from said end region.

10. The rail as claimed in claim 9, in which opposite ends of the ridges provided by the ridge sections taper downwardly towards the upper rail surface remote from said end region.

11. The rail as claimed in claim 1, in which the end region of each rail section is formed integrally with an elongate rail member.

12. The rail as claimed in claim 1, in which each rail section comprises an elongate rail member disposed end-to-end with a shorter rail end member, the end region of each rail section being formed integrally with the rail end member.

13. The rail as claimed in claim 1, in which the ridges are provided on capping members which are secured to respective complementary formations provided at the end regions of respective rail sections.

14. The rail as claimed in claim 13, in which the complementary formation of each rail section is formed integrally with an elongate rail member.

15. The rail as claimed in claim 13, in which each rail section comprises an elongate rail member disposed end-to-end with a shorter rail end member, the complementary formation of each rail section being formed integrally with the rail end member.

16. The rail as claimed in claim 13, in which each capping member comprises securing formations at its opposite ends for engaging complementary securing formations on the respective rail section.

17. A gantry crane comprising a pair of rails as claimed in claim 1, the rail sections of each rail being respectively provided on opposite sides of a hinge between a boom and fixed portion of the crane.

18. A method of forming the rail of claim 1, the method comprising mounting said rail sections on respective opposite sides of a joint between two support structures.

19. The method as claimed in claim 18, in which each rail section is formed by laying a short rail end member end-to-end with an elongate rail member, the short rail end members of each section extending from respective opposite sides of the joint.

20. The method as claimed in claim 19, in which a section of an elongate rail member is cut away and the short rail end member laid in its place.

21. The method as claimed in claim 18, comprising:

providing the ridges on capping members which are secured onto respective complementary formations at the end region of the respective rail section.

* * * * *